United States Patent
Castellanos Zamora et al.

(10) Patent No.: US 12,273,955 B2
(45) Date of Patent: Apr. 8, 2025

(54) SUPPORT OF SHORT MESSAGE SERVICE OVER INTERNET PROTOCOL (SMSoIP) IN 5G-ONLY DEPLOYMENTS

(71) Applicant: Telefonaktiebolaget LM Ericsson (publ), Stockholm (SE)

(72) Inventors: David Castellanos Zamora, Madrid (ES); Jose Miguel Dopico Sanjuan, Torrelodones (ES); Jesus Angel De Gregorio Rodriguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 422 days.

(21) Appl. No.: 17/798,761

(22) PCT Filed: Feb. 9, 2021

(86) PCT No.: PCT/IB2021/051042
§ 371 (c)(1),
(2) Date: Aug. 10, 2022

(87) PCT Pub. No.: WO2021/161169
PCT Pub. Date: Aug. 19, 2021

(65) Prior Publication Data
US 2023/0156454 A1    May 18, 2023

Related U.S. Application Data

(60) Provisional application No. 62/975,468, filed on Feb. 12, 2020.

(51) Int. Cl.
*H04W 8/04*    (2009.01)
*H04L 65/1016*  (2022.01)
*H04W 4/14*    (2009.01)

(52) U.S. Cl.
CPC ........... *H04W 8/04* (2013.01); *H04L 65/1016* (2013.01); *H04W 4/14* (2013.01)

(58) Field of Classification Search
None
See application file for complete search history.

(56) References Cited

U.S. PATENT DOCUMENTS

2019/0306695 A1    10/2019    Kim

FOREIGN PATENT DOCUMENTS

CN    110574449 A    12/2019
JP    2007-0534212 A    11/2007
(Continued)

OTHER PUBLICATIONS

"China Mobile, "Solution #3: SMS Messages Waiting Data handling", 3GPP SA WG2 Meeting #133, S2-1905485, May 17, 2018" (Year: 2018).*
(Continued)

*Primary Examiner* — Jenkey Van
(74) *Attorney, Agent, or Firm* — Weisberg I.P. Law, P.A.

(57) ABSTRACT

Apparatuses and methods for short message service (SMS) delivery are disclosed. In one embodiment, a method implemented in a data management (UDM) node includes receiving, by the UDM node, a registration request from a home subscriber server, HSS, node, the registration request being to register an Internet Protocol-Short Message-Gateway, IP-SM-GW, and the registration request comprising an address of the IP-SM-GW; and optionally, as a result of receiving the registration request comprising the address of the IP-SM-GW from the HSS node, determining message waiting data. In one embodiment, a method implemented in a HSS node includes receiving a registration request; and sending, to a unified data management, UDM, node, the registration request, the registration request being to register (Continued)

an Internet Protocol-Short Message-Gateway, IP-SM-GW, and the registration request comprising an address of the IP-SM-GW.

17 Claims, 10 Drawing Sheets

(56) References Cited

FOREIGN PATENT DOCUMENTS

| | | |
|---|---|---|
| JP | 2011-015224 A | 1/2011 |
| JP | 2017-076930 A | 4/2017 |
| WO | 2019/022442 A2 | 1/2019 |

OTHER PUBLICATIONS

"Ericsson, "Support of SMSoIP", 3GPP TSG-CT WG4 Meeting #98e, C4-203336, Jun. 12, 2020" (Year: 2020).*
International Search Report and Written Opinion dated Apr. 13, 2022 issued in PCT Application No. PCT/IB2021/051042, consisting of 15 pages.
Written Opinion of the International Preliminary Examining Authority dated Jan. 17, 2022 issued in PCT Application No. PCT/IB2021/051042, consisting of 8 pages.
Notification of the Transmittal of the International Preliminary Report on Patentability dated May 19, 2022 issued in PCT Application No. PCT/IB2021/051042, consisting of 25 pages.
ETSI TS 123 040 V15.3.0 (Apr. 2019); Digital Cellular Telecommunications System (Phase 2+) (GSM); Universal Mobile Telecommunications System (UMTS); Technical Realization of the Short Message Service (SMS); (3GPP TS 23.040 version 15.3.0 Release 15), consisting of 219 pages.
3GPP TS 23.204 V16.0.0 (Dec. 2019); 3rd Generation Partnership Project; Technical Specification Group Services and System Aspects; Support of Short Message Service (SMS) Over Generic 3GPP Internet Protocol (IP) Access; Stage 2 (Release 16), consisting of 59 pages.
3GPP TS 23.502 V16.3.0 (Dec. 2019); 3rd Generation Partnership Project; Technical Specification Group Services and System Aspects; Procedures for the 5G System (5GS); Stage 2 (Release 16), consisting of 558 pages.
3GPP TS 23.632 V16.0.0 (Dec. 2019); 3rd Generation Partnership Project; Technical Specification Group Core Network and Terminals; User Data Interworking, Coexistence and Migration; Stage 2 (Release 16), consisting of 33 pages.
ETSI TS 123 632 V16.2.0 (Oct. 2020); LTE; 5G; User Data Interworking, Coexistence and Migration; Stage 2 (3GPP TS 23.632 version 16.2.0 Release 16), consisting of 53 pages.
SA WG2 Meeting #129; S2-1810326 (revision of S2-18xxxx); Source: ZTE; Title: Update of Solution 2: Direct SBA UDM-HSS Interworking; Document for Approval; Agenda Item: TR 23.732/6.29; Work Item/Release: FS_UDICOM/Rel-16; Dongguan, China, Oct. 9, 2018, consisting of 4 pages.
Japanese Office Action and English Summary of the Japanese Office Action dated Aug. 4, 2023 issued in corresponding Japanese Patent Application No. 2022-545928, consisting of 9 pages.
3GPP TSG-SA WG2 Meeting #134; S2-1907239; Change Request 23.973 CR 0001 Rev—Current Version: 16.0.0; Title: TR 23.973 Clean Up; Source to WG: China Mobile; Source to TSG: SA2; Work Item Code: FS_UDICOM; Jun. 24-28, 2019, Sapporo, Japan, consisting of 25 pages.
3GPP TSG-CT WG4 Meeting #96e; C4-200882; Change Request 23.632 CR 0012 Rev—Current Version: 16.0.0; Title: Support of SMSoIP; Source to WG: Ericsson; Source to TSG: CT4; Work Item Code: UDICOM; eMeeting Feb. 17-28, 2020, consisting of 7 pages.
Chinese Office Action and English language summary translation of the Chinese Office Action dated Oct. 18, 2023 issued in corresponding Chinese Application No. 202180014413.3, consisting of 16 pages.

* cited by examiner

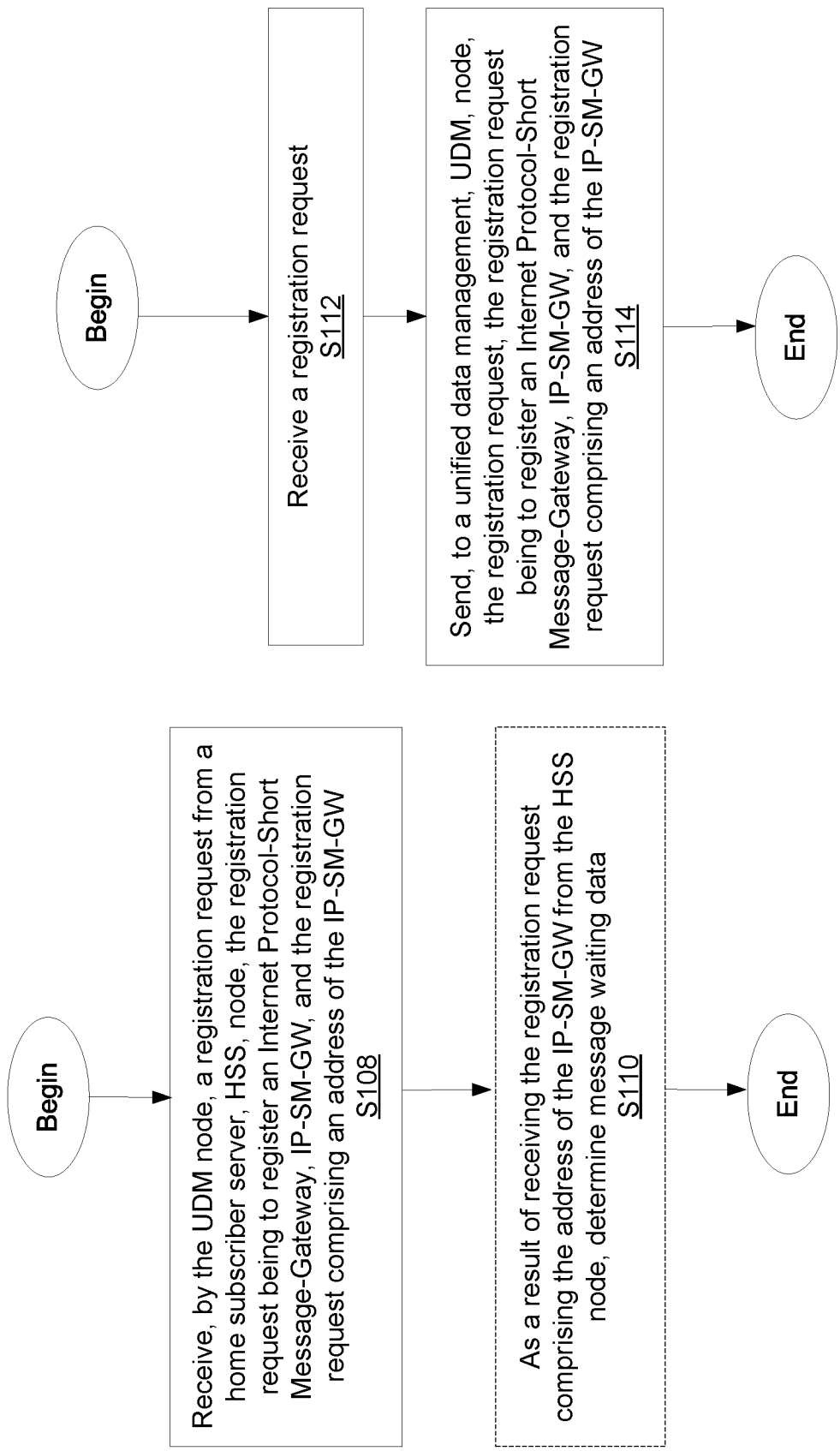

SUPPORT OF SHORT MESSAGE SERVICE OVER INTERNET PROTOCOL (SMSoIP) IN 5G-ONLY DEPLOYMENTS

CROSS-REFERENCE TO RELATED APPLICATIONS

This Application is a Submission Under 35 U.S.C. § 371 for U.S. National Stage Patent Application of International Application No.: PCT/IB2021/051042, filed Feb. 9, 2021 entitled "SUPPORT OF SHORT MESSAGE SERVICE OVER INTERNET PROTOCOL (SMSoIP) IN 5G-ONLY DEPLOYMENTS," which claims priority to U.S. Provisional Application No. 62/975,468, filed Feb. 12, 2020, entitled "SUPPORT OF SMSOIP IN 5G-ONLY DEPLOYMENTS," the entireties of both of which are incorporated herein by reference.

TECHNICAL FIELD

The present disclosure relates to wireless communication and in particular, methods and apparatuses for short message service (SMS) delivery.

BACKGROUND

Currently, Third Generation Partnership Project (3GPP) Technical Specification (TS) 23.632 defines system procedures and services related to Home Subscriber Server/Home Location Register (HSS/HLR) and Unified Data Management (UDM) interworking in User Data Interworking Coexistence and Migration (UDICoM) for Mobile Terminated Short Message Service (MT SMS) delivery support.

However, system procedures to provide MT SMS delivery support are still lacking.

SUMMARY

Some embodiments advantageously provide methods and apparatuses for SMS delivery, such as support of SMS over Internet Protocol (SMSoIP) in Third Generation Partnership Project (3GPP) $5^{th}$ Generation (5G, also called New Radio or NR)-only deployments.

In one embodiment, a method implemented in a data management (UDM) node includes receiving, from a home subscriber server (HSS) node, an address of an Internet Protocol-Short Message-Gateway (IP-SM-GW), the IP-SM-GW serving a user for a Short Message Service (SMS).

In one embodiment, a method implemented in a HSS node includes sending, to one of a unified data repository (UDR) node and a UDM node, an address of an IP-SM-GW, the IP-SM-GW serving a user for a SMS.

In one embodiment, a method implemented in a network node includes receiving, from an HSS node, an address of an IP-SM-GW, the IP-SM-GW serving a user for a SMS; and as a result of receiving a query from a UDM node for the address of the IP-SM-GW, sending the address of the IP-SM-GW to the UDM node.

According to an aspect of the present disclosure, method implemented in a unified data management, UDM, node, is provided. The method includes receiving, by the UDM node, a registration request from a home subscriber server, HSS, node, the registration request being to register an Internet Protocol-Short Message-Gateway, IP-SM-GW, and the registration request comprising an address of the IP-SM-GW. The method includes optionally, as a result of receiving the registration request comprising the address of the IP-SM-GW from the HSS node, determining message waiting data.

In some embodiments, the method further includes confirming the registration of the IP-SM-GW in a response message to the HSS node. In some embodiments, the method further includes storing the received address of the IP-SM-GW in a unified data repository, UDR, node as part of the registration of the IP-SM-GW. In some embodiments, the method further includes as a result of the registration of the IP-SM-GW and/or the received registration request comprising the address of the IP-SM-GW, one or more of: determining whether message waiting data are stored for a user associated with the IP-SM-GW; as a result of determining that the message waiting data are stored for the user, alerting at least one Short Message Service, SMS, service center, SC, and receiving a request for routing information from the at least one SMS SC; and using the address to communicate with the IP-SM-GW to provide a mobile terminated short message service, MT SMS, to a user equipment, UE, associated with the user.

In some embodiments, the method further includes one or more of: receiving, from the HSS node, a de-registration request to de-register the IP-SM-GW, the de-registration request comprising the address of the IP-SM-GW; and confirming a de-registration of the IP-SM-GW in a response message to the HSS node. In some embodiments, the method further includes removing the address of the IP-SM-GW from the UDR node as part of the de-registration of the IP-SM-GW. In some embodiments, one or more of: the HSS node comprises HSS functionality supporting Internet Protocol, IP, Multimedia Subsystem, IMS; and the HSS node lacks an HSS and/or Home Location Register, HLR, functionality supporting legacy access.

According to an aspect of the present disclosure, a method implemented in a home subscriber server, HSS, node is provided. The method includes receiving a registration request; and sending, to a unified data management, UDM, node, the registration request, the registration request being to register an Internet Protocol-Short Message-Gateway, IP-SM-GW, and the registration request comprising an address of the IP-SM-GW. In some embodiments, the method further includes receiving, from the UDM node, a confirmation of the registration of the IP-SM-GW in a response message. In some embodiments, the method further includes as a result of receiving a de-registration request, sending, to the UDM node, the de-registration request to de-register the IP-SM-GW, the de-registration request comprising the address of the IP-SM-GW; and receiving a confirmation of the de-registration of the IP-SM-GW in a response message. In some embodiments, one or more of: the HSS node comprises HSS functionality supporting Internet Protocol, IP, Multimedia Subsystem, IMS; and the HSS node lacks an HSS and/or Home Location Register, HLR, functionality supporting legacy access.

According to an aspect of the present disclosure, a method implemented in a system is provided. The system comprises a unified data management, UDM, node and a home subscriber server, HSS, node. The method comprises one or more of: the HSS node sending, to the UDM node, a registration request to register an Internet Protocol-Short Message-Gateway, IP-SM-GW, the registration request comprising an address of the IP-SM-GW; and the UDM node receiving, from the HSS node, the registration request comprising the address of the IP-SM-GW.

In some embodiments, the method further includes the UDM node storing the received address of the IP-SM-GW in a unified data repository, UDR, node as part of the registration of the IP-SM-GW. In some embodiments, the method further includes the UDM node confirming the registration of the IP-SM-GW in a response message to the HSS node. In some embodiments, the method further includes as a result of the registration of the IP-SM-GW and/or the received registration request comprising the address of the IP-SM-GW, one or more of: the UDM node determining whether message waiting data are stored for a user associated with the IP-SM-GW; the UDM node, as a result of determining that the message waiting data are stored for the user, alerting at least one Short Message Service, SMS, service center, SC, and receiving a request for routing information from the at least one SMS SC; and the UDM node using the address to communicate with the IP-SM-GW to provide a mobile terminated short message service, MT SMS, to a user equipment, UE, associated with the user.

In some embodiments, the method further includes the HSS node sending, to the UDM node, a de-registration request to de-register the IP-SM-GW, the de-registration request comprising the address of the IP-SM-GW; the UDM node receiving, from the HSS node, the de-registration request comprising the address of the IP-SM-GW; the UDM node confirming the de-registration of the IP-SM-GW in a response message to the HSS node; and the UDM node removing the address of the IP-SM-GW from a UDR node as part of the de-registration of the IP-SM-GW. In some embodiments, one or more of: the HSS node comprises HSS functionality supporting Internet Protocol, IP, Multimedia Subsystem, IMS; and the HSS node lacks an HSS and/or Home Location Register, HLR, functionality supporting legacy access.

According to an aspect of the present disclosure, a unified data management, UDM, node is provided. The UDM node comprises processing circuitry. The processing circuitry is configured to cause the UDM node to perform any one or more of the methods above.

According to an aspect of the present disclosure, a home subscriber server, HSS, node is provided. The HSS node comprises processing circuitry. The processing circuitry is configured to cause the HSS node to perform any one or more of the methods above.

According to an aspect of the present disclosure, a system is provided. The system comprises processing circuitry. The processing circuitry is configured to cause the system to perform any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart of an exemplary process in a UDM node according to some embodiments of the present disclosure;

FIG. 8 is a flowchart of an exemplary process in an HSS node according to some embodiments of the present disclosure;

DETAILED DESCRIPTION

As described above, 3GPP TS 23.632 currently defines system procedures and services related to HSS/HLR and UDM interworking in UDICoM for MT SMS delivery support.

The scenarios considered assume that there is an HSS/HLR receiving requests from the Short Message Service-Gateway Mobile Switching Center (SMS-GMSC) over Mobile Application Part C (MAP C) and/or Diameter S6c reference points. These MAP C and Diameter S6c reference points with the SMS-GMSC are exposed by the HSS/HLR functionality supporting the Second Generation/Third Generation/Fourth Generation (2G/3G/4G) accesses as defined in, for example, 3GPP TS 23.040.

However, in the context of 3GPP Release 16 (Rel-16) UDICoM, for MT SMS delivery over Fifth Generation (5G, also called New Radio/NR) Non-Access-Stratum (NAS) in deployment scenarios where 2G/3G/4G accesses are not supported, the MAP C and Diameter S6c reference points with the SMS-GMSC are exposed by the UDM instead, since there may be no deployment of the HLR/HSS functionality supporting the legacy accesses and their corresponding reference points in the first place.

In these scenarios (e.g., MT SMS delivery over 5G NAS in deployment scenarios where 2G/3G/4G accesses are not supported), if support for SMSoIP is also expected, an HSS supporting Internet Protocol (IP) Multimedia Subsystem (IMS) functionality may be used including the support for the registration/de-registration of the IP-Short Message-Gateway (IP-SM-GW) address in the HSS over e.g., the Sh reference point as defined in, for example, 3GPP TS 23.204.

However, the HSS functionality supporting IMS does not expose the MAP C or Diameter S6c reference points with SMS-GMSC and neither the MAP J or Diameter S6c reference points with the IP-SM-GW. In the context of 3GPP Rel-16 UDICoM, in these cases, the MAP C/J and/or Diameter S6c reference points are exposed by the UDM instead. An example of these scenarios is depicted in an example system 10 in FIG. 1.

The system 10 includes an IP-SM-GW 12, SMS-GMSC 14, UDM 16, HSS 18, Proxy-Call Session Control Function (P-CSCF) 20, UE 22 and Serving-Call Session Control Function (S-CSCF) 24.

In some embodiments, the IP-SM-GW may be considered to provide an IMS application server which handles session initiation protocol (SIP) based messaging services for IMS subscribers. In addition, the IP-SM-GW may interact with the legacy short message service center (SMSC) using MAP signaling in order to allow IMS to SMS conversion and distribution. In some embodiments, the IP-SM-GW may be considered to implement transport layer interworking for SMS over IP.

Figure 1:
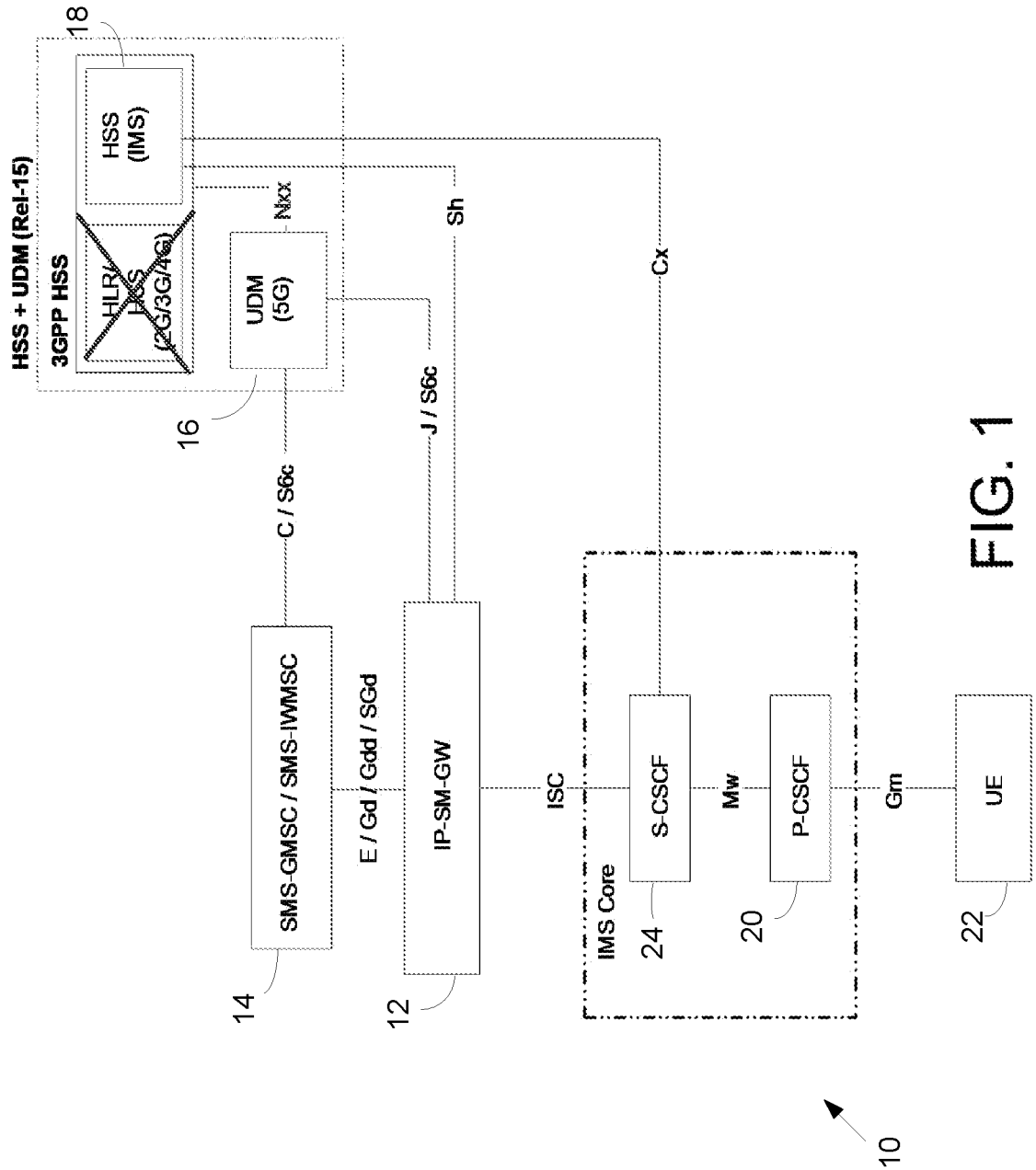
FIG. 1 illustrates an example system and scenario in which the IP-SM-GW address is unavailable to support MT SMS delivery.

As can be seen in FIG. 1, for MT SMS delivery, the UDM 16 may attempt to involve the IP-SM-GW 12, but the IP-SM-GW address is not kept at the UDM 16 but at the HSS (IMS) 18 instead. The IP-SM-GW 12 will register in the HSS (IMS) while the SMS-GMSC 14 and IP-SM-GW 12 will interact with the UDM 16.

In the context of 3GPP Rel-16 UDICoM, for MT SMS delivery over 5G NAS in deployment scenarios where 2G/3G/4G accesses are not supported and where support for SMS over IP is also expected, interactions between the UDM 16 and the HSS (IMS) 18 should be specified for e.g., the transfer of the IP-SM-GW address. Handling of the IP-SM-GW address in the interactions with Fifth Generation System UDR (5GS-UDR) via e.g., an Nudr interface should also be considered.

Some embodiments of the present disclosure provide for one or more new procedures to make the IP-SM-GW address available to the UDM in deployment scenarios where, for example, 2G/3G/4G accesses are not supported and support of SMS over IP is expected.

Some embodiments of the present disclosure may allow the UDM to identify and/or locate the IP-SM-GW that is serving a user for SMS. Some embodiments may provide proper support of MT SMS delivery procedures in 5G Core (5GC) only deployments where SMSoIP is required.

Before describing in detail exemplary embodiments, it is noted that the embodiments reside primarily in combinations of apparatus components and processing steps related to short message service (SMS) delivery. Accordingly, components have been represented where appropriate by conventional symbols in the drawings, showing only those specific details that are pertinent to understanding the apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a subscriber server node (e.g., HSS) and/or a data management node (e.g., UDM). In some embodiments, the node may be, for example, a core network node, such as a 5G and/or NR network node, an IMS node, a Network Function (NF) node, such as, for example, a P-CSCF node, an S-CSCF node, an I-CSCF node, etc.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

In some embodiments, the terms "gateway" and "IP-SM-GW" may be used interchangeably. In some embodiments, the terms "data management node" may be used interchangeably with "UDM node". In some embodiments, the terms "subscriber node" and "HSS node" may be used interchangeably. In some embodiments, the terms "data repository node" and "UDR node" may be used interchangeably.

In some embodiments, the "address" herein may be considered an IP address or any other type of address or location identifier that may be used to identify and/or locate the IP-SM-GW for the user.

In some embodiments, the term "legacy access" may mean an HSS and/or HLR functionality supporting Evolved Packet Core (EPC) and/or circuit switched/packet switched (CS/PS) access technologies, respectively. Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or a UDM node or an HSS node or any network node may be distributed over a plurality of UEs or a plurality of UDM nodes or a plurality of HSS nodes or a plurality of network nodes. In other words, it is contemplated that the functions of the UE, UDM node, HSS node or network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
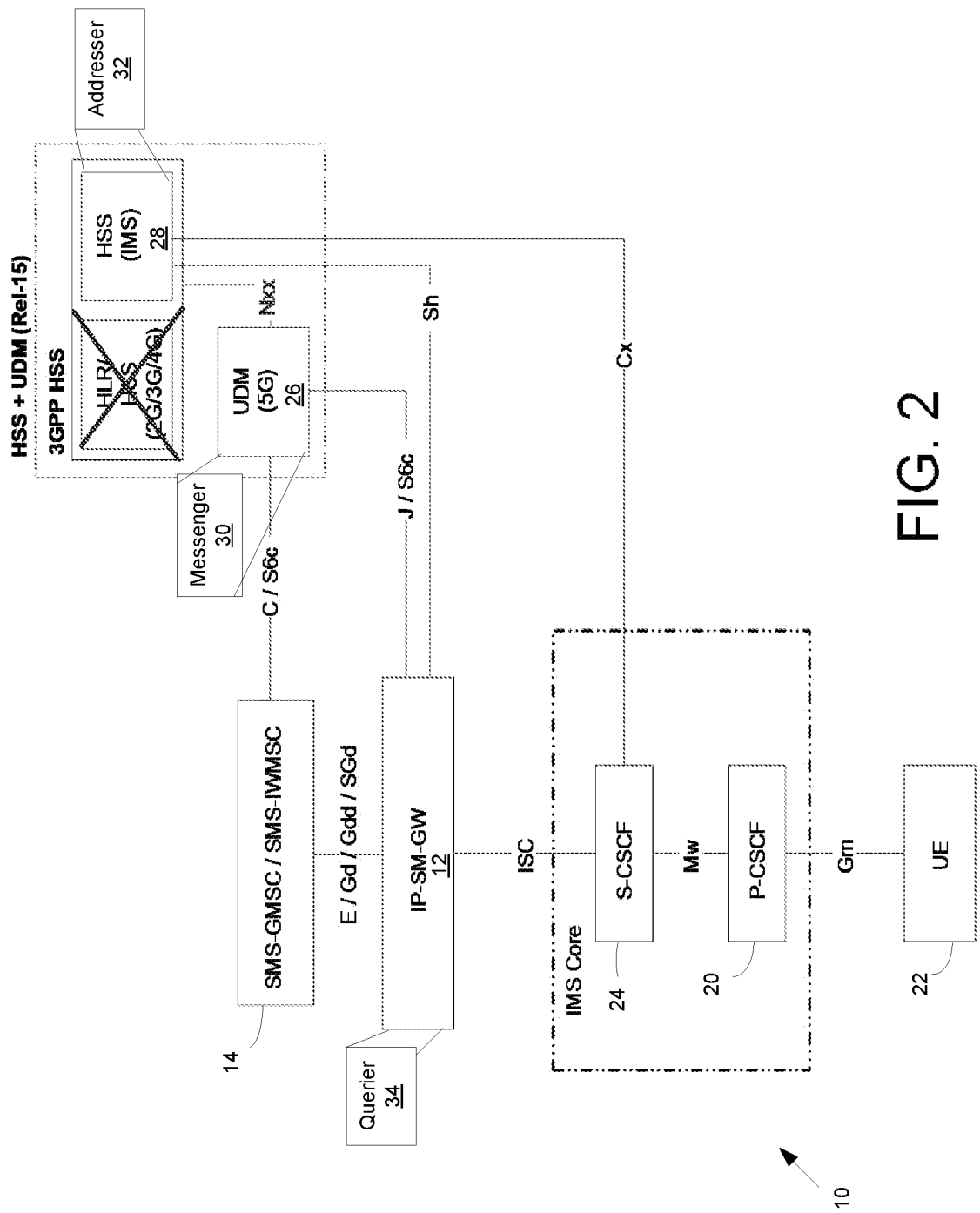
FIG. 2 illustrates an example system architecture according to some embodiments of the present disclosure.

Referring again to the drawing figures, in which like elements are referred to by like reference numerals, there is shown in FIG. 2 a schematic diagram of a communication system 10, according to an embodiment, constructed in accordance with the principles of the present disclosure. The communication system 10 in FIG. 2 is a non-limiting example and other embodiments of the present disclosure may be implemented by one or more other systems and/or networks. Referring to FIG. 2, the system 10 includes a UDM 26 and HSS 28 that may be configured according to one or more of the embodiments of the present disclosure. In addition, the system 10 includes the IP-SM-GW 12, SMS-GMSC 14, UE 22 and an IMS core including a P-CSCF 20 and a S-CSCF 24.

The system 10 may include UDM 26 configured to include messenger 30 which is configured to cause UDM 26 to receive a registration request from a home subscriber server, HSS, node, the registration request being to register an Internet Protocol-Short Message-Gateway, IP-SM-GW, and the registration request comprising an address of the IP-SM-GW; and optionally, as a result of receiving the registration request comprising the address of the IP-SM-GW from the HSS node, determine message waiting data. The system 10 includes HSS 28 configured to include addresser 32 which is configured to cause HSS 28 to receive a registration request; and send, to a unified data management, UDM, node, the registration request, the registration request being to register an Internet Protocol-Short Message-Gateway, IP-SM-GW, and the registration request comprising an address of the IP-SM-GW. The system 10 includes querier 34 which is configured to query a unified data repository (UDR) node for the address of the IP-SM-GW.

It should be noted that, for simplicity, a single node is shown for the various entities in the system 10 depicted in FIG. 2 (e.g., a single UE 22, a single IP-SM-GW 12, a single IMS core, a single UDM 26, a single HSS 28, etc.). It should be understood that the system 10 may include numerous entities/nodes of those shown in FIG. 2, as well as, additional entities/nodes not shown in FIG. 2. In addition, the system 10 may include many more connections/interfaces than those shown in FIG. 2.

Example implementations, in accordance with an embodiment, of the UE 22, UDM node 26, HSS node 28 and a network node 36 (e.g., Unified Data Repository (UDR) or any other node) discussed herein will now be described with reference to FIG. 3. It is noted that, the interconnection of the UE 22, UDM node 26, HSS node 28 and network node 36 are shown in serial, such depiction is for the sake of simplicity and ease of explanation. It is understood that or more of the UE 22, UDM node 26, HSS node 28 and the network node 36 may communicate via a wired and/or wireless network, i.e., cloud network, and that the UE 22, UDM node 26, HSS node 28 and the network node 36 are not literally connected to one another. In other words, in FIG. 3, the connection between the devices UE 22, UDM node 26, HSS node 28 and network node 36 (e.g., UDR) is shown without explicit reference to any intermediary devices or connections. However, it should be understood that intermediary devices and/or connections may exist between these devices, although not explicitly shown.

The UE 22 includes a communication interface 38, processing circuitry 40, and memory 42. The communication interface 38 may be configured to communicate with any other elements/nodes in the system 10 according to the techniques in the present disclosure. In some embodiments, the communication interface 38 may be formed as or may include, for example, one or more radio frequency (RF) transmitters, one or more RF receivers, and/or one or more RF transceivers, and/or may be considered a radio interface. In some embodiments, the communication interface 38 may include a wired interface.

The processing circuitry 40 may include one or more processors 44 and memory, such as, the memory 42. In particular, in addition to a traditional processor and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further include software stored internally in, for example, memory 42, or stored in external memory (e.g., database) accessible by the UE 22 via an external connection. The software may be executable by the processing circuitry 40. The processing circuitry 40 may be configured to control any of the methods and/or processes described herein and/or to cause such methods, and/or processes to be performed, e.g., by the UE 22. The memory 42 is configured to store data, programmatic software code and/or other information described herein. In some embodiments, the software may include instructions stored in memory 42 that, when executed by the processor 44 causes the processing circuitry 40 and/or configures the UE 22 to perform the processes described herein with respect to the UE 22.

The UDM node 26 includes a communication interface 46, processing circuitry 48, and memory 50. The communication interface 46 may be configured to communicate with any other elements/nodes in the system 10 according to the techniques in the present disclosure. In some embodiments, the communication interface 46 may be formed as or may include, for example, one or more radio frequency (RF) transmitters, one or more RF receivers, and/or one or more RF transceivers, and/or may be considered a radio interface. In some embodiments, the communication interface 46 may include a wired interface.

The processing circuitry 48 may include one or more processors 52 and memory, such as, the memory 50. In particular, in addition to a traditional processor and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) the memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UDM node 26 may further include software stored internally in, for example, memory 50, or stored in external memory (e.g., database) accessible by the UDM node 26 via an external connection. The software may be executable by the processing circuitry 48. The processing circuitry 48 may be configured to control any of the methods and/or processes described herein and/or to cause such methods, and/or processes to be performed, e.g., by the UDM node 26. The memory 50 is configured to store data, programmatic software code and/or other information described herein. In some embodiments, the software may include instructions stored in memory 50 that, when executed by the processor 52 and/or messenger 30, causes the processing circuitry 48 and/or configures the UDM node 26 to perform the processes described herein with respect to the UDM node 26 (e.g., processes described with reference to FIG. 4 and/or any of the other flowcharts).

The HSS node 28 includes a communication interface 54, processing circuitry 56, and memory 58. The communication interface 54 may be configured to communicate with any other elements/nodes in the system 10 according to the techniques in the present disclosure. In some embodiments, the communication interface 54 may be formed as or may include, for example, one or more radio frequency (RF) transmitters, one or more RF receivers, and/or one or more RF transceivers, and/or may be considered a radio interface. In some embodiments, the communication interface 54 may include a wired interface.

The processing circuitry 56 may include one or more processors 60 and memory, such as, the memory 58. In particular, in addition to a traditional processor and memory, the processing circuitry 56 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) the memory 58, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the HSS node 28 may further include software stored internally in, for example, memory 58, or stored in external memory (e.g., database) accessible by the HSS node 28 via an external connection. The software may be executable by the processing circuitry 56. The processing circuitry 56 may be configured to control any of the methods and/or processes described herein and/or to cause such methods, and/or processes to be performed, e.g., by the HSS node 28. The memory 58 is configured to store data, programmatic software code and/or other information described herein. In some embodiments, the software may include instructions stored in memory 58 that, when executed by the processor 60 and/or addresser 32, causes the processing circuitry 56 and/or configures the HSS node 28 to perform the processes described herein with respect to the HSS node 28 (e.g., processes described with reference to FIG. 5 and/or any of the other flowcharts).

The network node 36 (e.g., UDR node, IP-SM-GW, etc.) includes a communication interface 62, processing circuitry 64, and memory 66. The communication interface 62 may be configured to communicate with any other elements/nodes in the system 10 according to the techniques in the present disclosure. In some embodiments, the communication interface 62 may be formed as or may include, for example, one or more radio frequency (RF) transmitters, one or more RF receivers, and/or one or more RF transceivers, and/or may be considered a radio interface. In some embodiments, the communication interface 62 may include a wired interface.

The processing circuitry 64 may include one or more processors 68 and memory, such as, the memory 66. In particular, in addition to a traditional processor and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 68 may be configured to access (e.g., write to and/or read from) the memory 66, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 36 may further include software stored internally in, for example, memory 66, or stored in external memory (e.g., database) accessible by the network node 36 via an external connection. The software may be executable by the processing circuitry 64. The processing circuitry 64 may be configured to control any of the methods and/or processes described herein and/or to cause such methods, and/or processes to be performed, e.g., by the network node 36. The memory 66 is configured to store data, programmatic software code and/or other information described herein. In some embodiments, the software may include instructions stored in memory 66 that, when executed by the processor 68 and/or querier 34, causes the processing circuitry 64 and/or configures the network node 36 to perform the processes described herein with respect to the network node 36 (e.g., 5GS-UDR node, IP-SM-GW, etc.) such as the processes described with reference to FIG. 6 as well as other figures.

Figure 3:
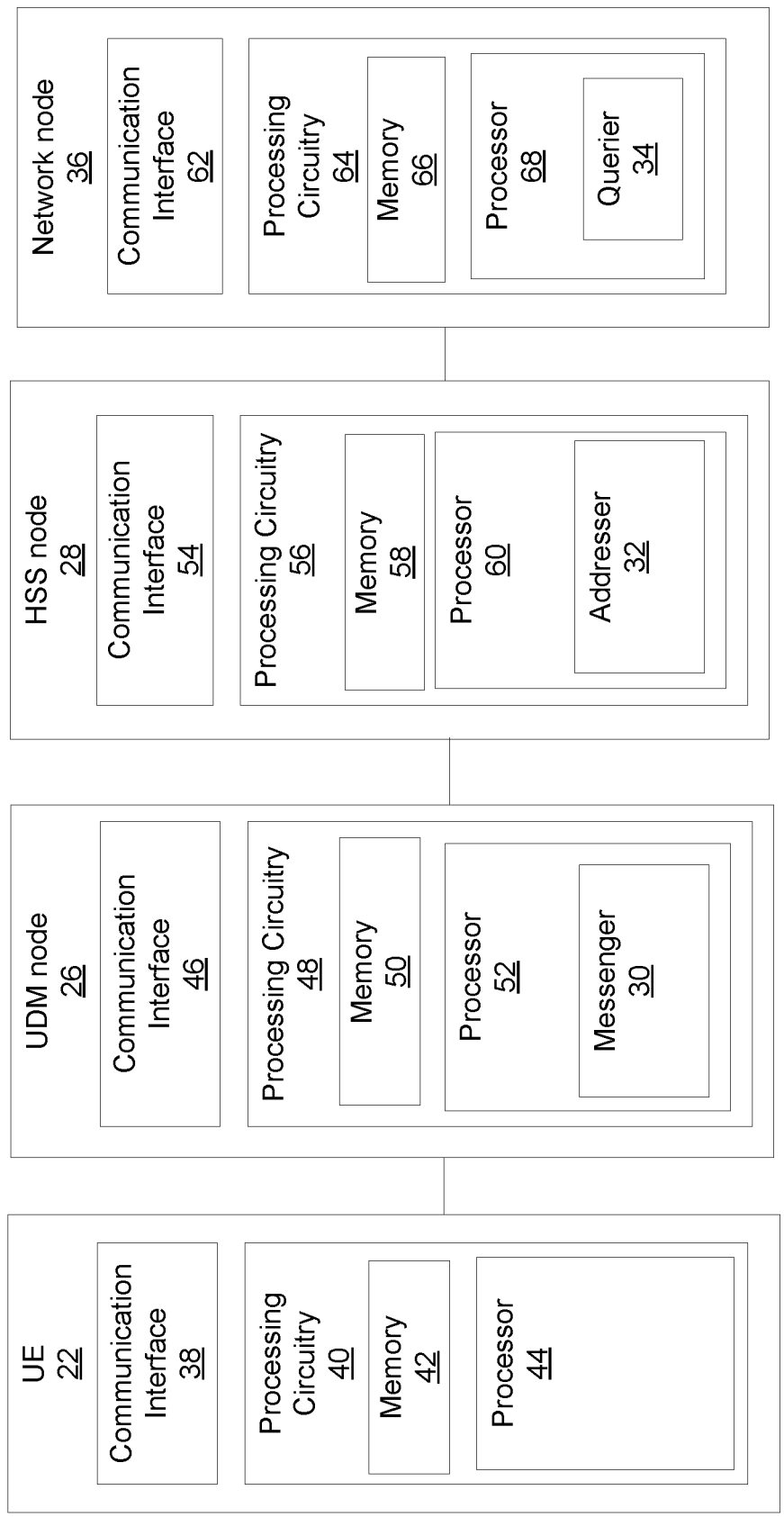
FIG. 3 illustrates yet another example system architecture and example hardware arrangements for devices in the system, according to some embodiments of the present disclosure.

Although FIG. 3 shows messenger 30, addresser 32, querier 34 as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 4:
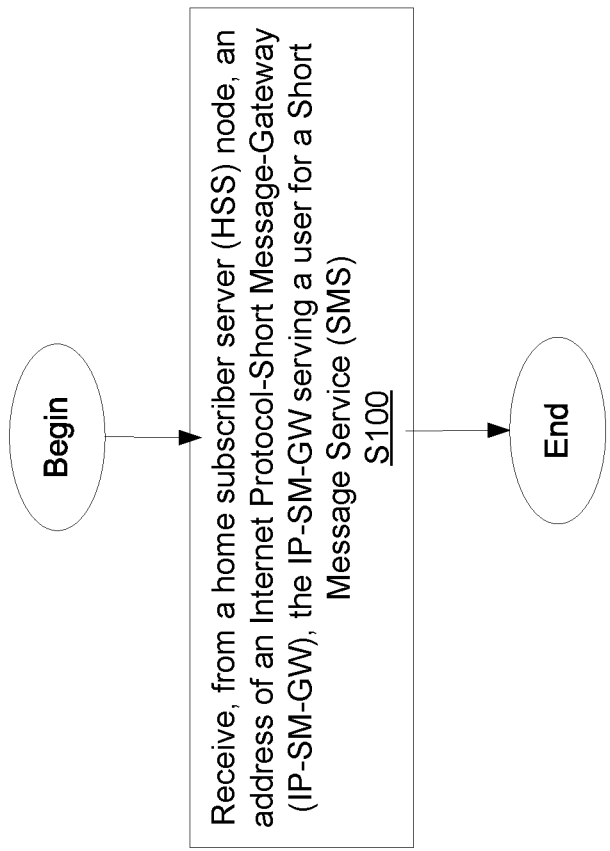
FIG. 4 is a flowchart of an exemplary process in a UDM node according to some embodiments of the present disclosure.

FIG. 4 is a flowchart of an exemplary process in a UDM node 26 for supporting delivery of an SMS message to the UE 22 according to one or more of the techniques in the present disclosure. One or more Blocks and/or functions and/or methods performed by the UDM node 26 may be performed by one or more elements of UDM node 26 such as by messenger 30 in processing circuitry 48, memory 50, processor 52, communication interface 46, etc. according to the example process/method. The example process includes receiving (Block S100), such as via messenger 30, processing circuitry 48, memory 50, processor 52 and/or communication interface 46, from a home subscriber server (HSS) node 28, an address of an Internet Protocol-Short Message-Gateway (IP-SM-GW) 12, the IP-SM-GW 12 serving a user for a Short Message Service (SMS).

In some embodiments, receiving the address of the IP-SM-GW from the HSS node includes receiving, such as via messenger 30, processing circuitry 48, memory 50, processor 52 and/or communication interface 46, a registration request to register the IP-SM-GW in a unified data management (UDM) node, the registration request including the address of the IP-SM-GW associated with the user.

In some embodiments, the method further includes at least one of: receiving, such as via messenger 30, processing circuitry 48, memory 50, processor 52 and/or communication interface 46, a de-registration request to de-register the IP-SM-GW, the de-registration request including the address of the IP-SM-GW; and confirming, such as via messenger 30, processing circuitry 48, memory 50, processor 52 and/or communication interface 46, one of the registration and the de-registration of the IP-SM-GW in a response message.

In some embodiments, the method includes one or more of, such as via messenger 30, processing circuitry 48, memory 50, processor 52 and/or communication interface 46: storing the address in a unified data repository (UDR) node as part of the registration of the IP-SM-GW; removing the address in the UDR node as part of the registration of the IP-SM-GW; determining whether message waiting data are stored for the user associated with the IP-SM-GW; and/or using the address to communicate with the IP-SM-GW to provide a mobile terminated short message service (MT SMS) to a user equipment (UE) associated with the user.

In some embodiments, receiving the address of the IP-SM-GW from the HSS node includes determining, such as via messenger 30, processing circuitry 48, memory 50, processor 52 and/or communication interface 46, whether the address is available in a home subscriber server (HSS) node by sending a request to the HSS node; and as a result of the request, receiving, such as via messenger 30, processing circuitry 48, memory 50, processor 52 and/or communication interface 46, a response from the HSS node, the response including the address of the IP-SM-GW associated with the user.

In some embodiments, receiving the address of the IP-SM-GW from the HSS node includes querying, such as via messenger 30, processing circuitry 48, memory 50, processor 52 and/or communication interface 46, a unified data repository (UDR) node for the address of the IP-SM-GW; and responsive to the query, receiving, such as via messenger 30, processing circuitry 48, memory 50, processor 52 and/or communication interface 46, the address from the UDR node.

Figure 5:
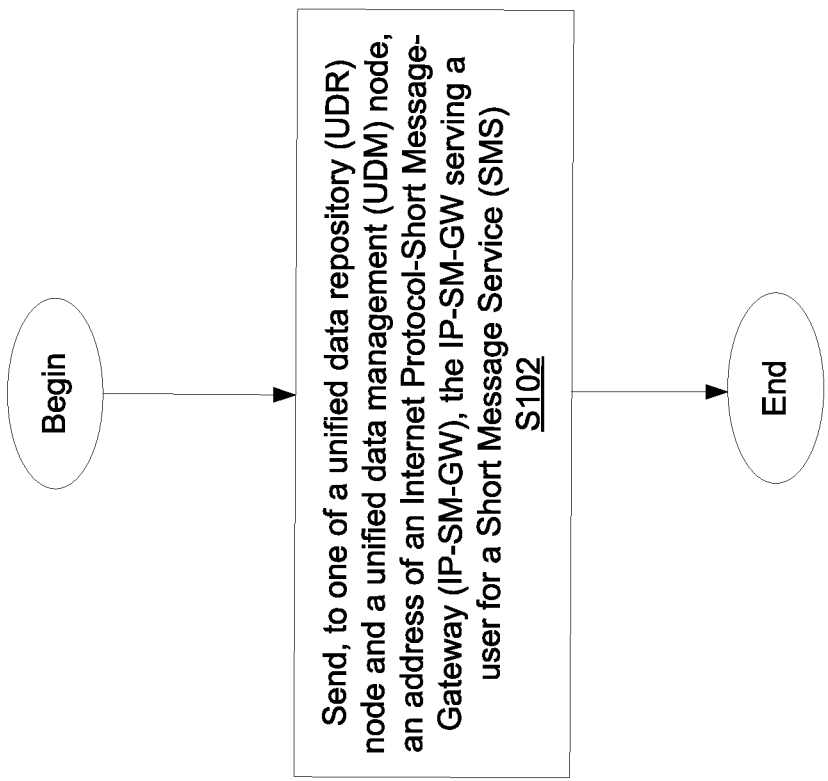
FIG. 5 is a flowchart of an exemplary process in an HSS node according to some embodiments of the present disclosure.

FIG. 5 is a flowchart of an exemplary process in an HSS node 28 for supporting delivery of an SMS message to the UE 22 according to one or more of the techniques in the present disclosure. One or more Blocks and/or functions and/or methods performed by the HSS node 28 may be performed by one or more elements of HSS node 28 such as via addresser 32 in processing circuitry 56, memory 58, processor 60, communication interface 54, etc. according to the example process/method. The example process includes sending (Block S102), such as via addresser 32, processing circuitry 56, memory 58, processor 60 and/or communication interface 54, to one of a unified data repository (UDR) node and a unified data management (UDM) node, an address of an Internet Protocol-Short Message-Gateway (IP-SM-GW), the IP-SM-GW serving a user for a Short Message Service (SMS).

In some embodiments, sending, to the UDM node, the address of the IP-SM-GW includes sending, such as via addresser 32, processing circuitry 56, memory 58, processor 60 and/or communication interface 54, a registration request to register the IP-SM-GW, the registration request including the address of the IP-SM-GW associated with the user. In some embodiments, the method further includes at least one of: sending, such as via addresser 32, processing circuitry 56, memory 58, processor 60 and/or communication interface 54, a de-registration request to de-register the IP-SM-GW, the de-registration request including the address of the IP-SM-GW; and receiving, such as via addresser 32, processing circuitry 56, memory 58, processor 60 and/or communication interface 54, a confirmation of one of the registration and the de-registration of the IP-SM-GW in a response message.

In some embodiments, sending, to the UDM node, the address of the IP-SM-GW is responsive to the HSS node 28: receiving, such as via addresser 32, processing circuitry 56, memory 58, processor 60 and/or communication interface 54, a request for the address from the UDM node; and responsive to the request, sending, such as via addresser 32, processing circuitry 56, memory 58, processor 60 and/or communication interface 54, a response to the UDM node, the response including the address of the IP-SM-GW associated with the user. In some embodiments, sending the address of the IP-SM-GW includes sending the address of the IP-SM-GW to the UDR node.

Figure 6:
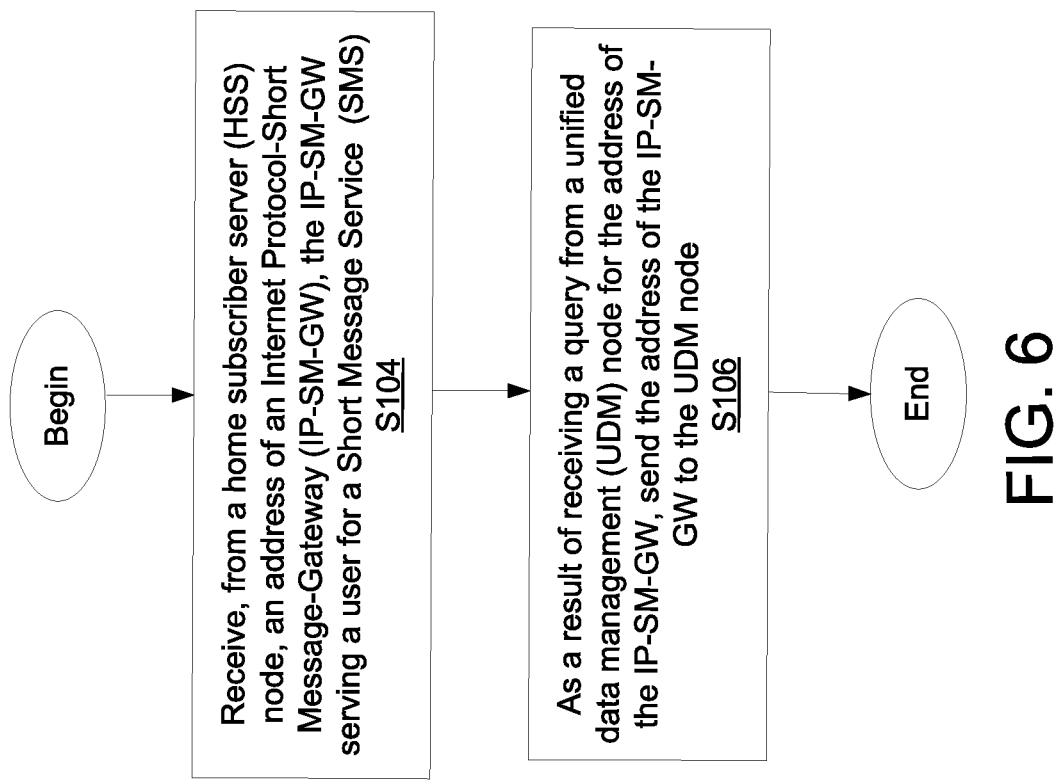
FIG. 6 is a flowchart of an exemplary process in a network node (e.g., UDR node) according to some embodiments of the present disclosure.

FIG. 6 is a flowchart of an exemplary process in a network node 36 (e.g., UDR node) for supporting delivery of an SMS message to the UE 22 according to one or more of the techniques in the present disclosure. One or more Blocks and/or functions and/or methods performed by the network node 36 may be performed by one or more elements of network node 36 such as via querier 34 in processing circuitry 64, memory 66, processor 68, communication interface 62, etc. according to the example process/method. The example process includes receiving (Block S104), such as via querier 34, processing circuitry 64, memory 66, processor 68 and/or communication interface 62, from a home subscriber server (HSS) node, an address of an Internet Protocol-Short Message-Gateway (IP-SM-GW), the IP-SM-GW serving a user for a Short Message Service (SMS). The process includes as a result of receiving a query from a unified data management (UDM) node for the address of the IP-SM-GW, sending (Block S106), such as via querier 34, processing circuitry 64, memory 66, processor 68 and/or communication interface 62, the address of the IP-SM-GW to the UDM node. In some embodiments, the network node 36 is a unified data repository (UDR) node.

FIG. 7 is a flowchart of an exemplary process in a UDM node 26 for supporting delivery of an SMS message to the UE 22 according to one or more of the techniques in the present disclosure. One or more Blocks and/or functions and/or methods performed by the UDM node 26 may be performed by one or more elements of UDM node 26 such as by messenger 30 in processing circuitry 48, memory 50, processor 52, communication interface 46, etc. according to the example process/method. The example process includes receiving (Block S108) by the UDM node, such as by messenger 30, processing circuitry 48, memory 50, processor 52 and/or communication interface 46, a registration request from a home subscriber server, HSS, node, the registration request being to register an Internet Protocol-Short Message-Gateway, IP-SM-GW, and the registration request comprising an address of the IP-SM-GW. The method includes optionally, as a result of receiving the registration request comprising the address of the IP-SM-GW from the HSS node, determining (Block S110), such as by messenger 30, processing circuitry 48, memory 50, processor 52 and/or communication interface 46, message waiting data.

In some embodiments, the method includes confirming, such as by messenger 30, processing circuitry 48, memory 50, processor 52 and/or communication interface 46, the registration of the IP-SM-GW in a response message to the HSS node. In some embodiments, the method includes storing, such as by messenger 30, processing circuitry 48, memory 50, processor 52 and/or communication interface 46, the received address of the IP-SM-GW in a unified data repository, UDR, node as part of the registration of the IP-SM-GW. In some embodiments, the method includes as a result of the registration of the IP-SM-GW and/or the received registration request comprising the address of the IP-SM-GW, one or more of: determining, such as by messenger 30, processing circuitry 48, memory 50, processor 52 and/or communication interface 46, whether message waiting data are stored for a user associated with the IP-SM-GW; as a result of determining that the message waiting data are stored for the user, alerting, such as by messenger 30, processing circuitry 48, memory 50, processor 52 and/or communication interface 46, at least one Short Message Service, SMS, service center, SC, and receiving a request for routing information from the at least one SMS SC; and using, such as by messenger 30, processing circuitry 48, memory 50, processor 52 and/or communication interface 46, the address to communicate with the IP-SM-GW to provide a mobile terminated short message service, MT SMS, to a user equipment, UE, associated with the user.

In some embodiments, the method includes one or more of: receiving, such as by messenger 30, processing circuitry 48, memory 50, processor 52 and/or communication interface 46, from the HSS node, a de-registration request to de-register the IP-SM-GW, the de-registration request comprising the address of the IP-SM-GW; and confirming, such as by messenger 30, processing circuitry 48, memory 50, processor 52 and/or communication interface 46, a de-registration of the IP-SM-GW in a response message to the HSS node. In some embodiments, the method includes removing, such as by messenger 30, processing circuitry 48, memory 50, processor 52 and/or communication interface 46, the address of the IP-SM-GW from the UDR node as part of the de-registration of the IP-SM-GW. In some embodiments, one or more of: the HSS node comprises HSS functionality supporting Internet Protocol, IP, Multimedia Subsystem, IMS; and the HSS node lacks an HSS and/or Home Location Register, HLR, functionality supporting legacy access.

FIG. 8 is a flowchart of an exemplary process in an HSS node 28 for supporting delivery of an SMS message to the UE 22 according to one or more of the techniques in the present disclosure. One or more Blocks and/or functions and/or methods performed by the HSS node 28 may be performed by one or more elements of HSS node 28 such as via addresser 32 in processing circuitry 56, memory 58, processor 60, communication interface 54, etc. according to the example process/method. The example process includes receiving (Block S112), such as via addresser 32, processing circuitry 56, memory 58, processor 60 and/or communication interface 54, a registration request. The method includes sending (Block S114), such as via addresser 32, processing circuitry 56, memory 58, processor 60 and/or communication interface 54, to a unified data management, UDM, node, the registration request, the registration request being to register an Internet Protocol-Short Message-Gateway, IP-SM-GW, and the registration request comprising an address of the IP-SM-GW.

In some embodiments, the method further includes receiving, such as via addresser 32, processing circuitry 56, memory 58, processor 60 and/or communication interface 54, from the UDM node, a confirmation of the registration of the IP-SM-GW in a response message. In some embodiments, the method further includes as a result of receiving a de-registration request, sending, such as via addresser 32, processing circuitry 56, memory 58, processor 60 and/or communication interface 54, to the UDM node, the de-registration request to de-register the IP-SM-GW, the de-registration request comprising the address of the IP-SM-GW; and receiving, such as via addresser 32, processing circuitry 56, memory 58, processor 60 and/or communication interface 54, a confirmation of the de-registration of the IP-SM-GW in a response message. In some embodiments, one or more of: the HSS node comprises HSS functionality supporting Internet Protocol, IP, Multimedia Subsystem, IMS; and the HSS node lacks an HSS and/or Home Location Register, HLR, functionality supporting legacy access.

Having generally described arrangements for supporting short message service (SMS) delivery in certain scenarios, a more detailed description of some of the embodiments are provided as follows with reference to FIGS. 9-12, and which may be implemented by UE 22, UDM node 26, HSS node 28 and/or any network node (e.g., network node 36, UDR node, etc.) discussed herein.

Some embodiments of the present disclosure provide a new procedure to make the IP-SM-GW address available to the UDM node 26 in deployment scenarios where 2G/3G/4G accesses are not supported and support of SMS over IP is expected to be provided. Some example embodiments and/or alternatives to define the interactions that allow the UDM node 26 to obtain the IP-SM-GW address are described below with reference to the call flow diagrams in FIGS. 9-12, in which at least some notable steps are bolded below for clarity.

Embodiment 1: IP-SM-GW Registration in UDM

Figure 9:
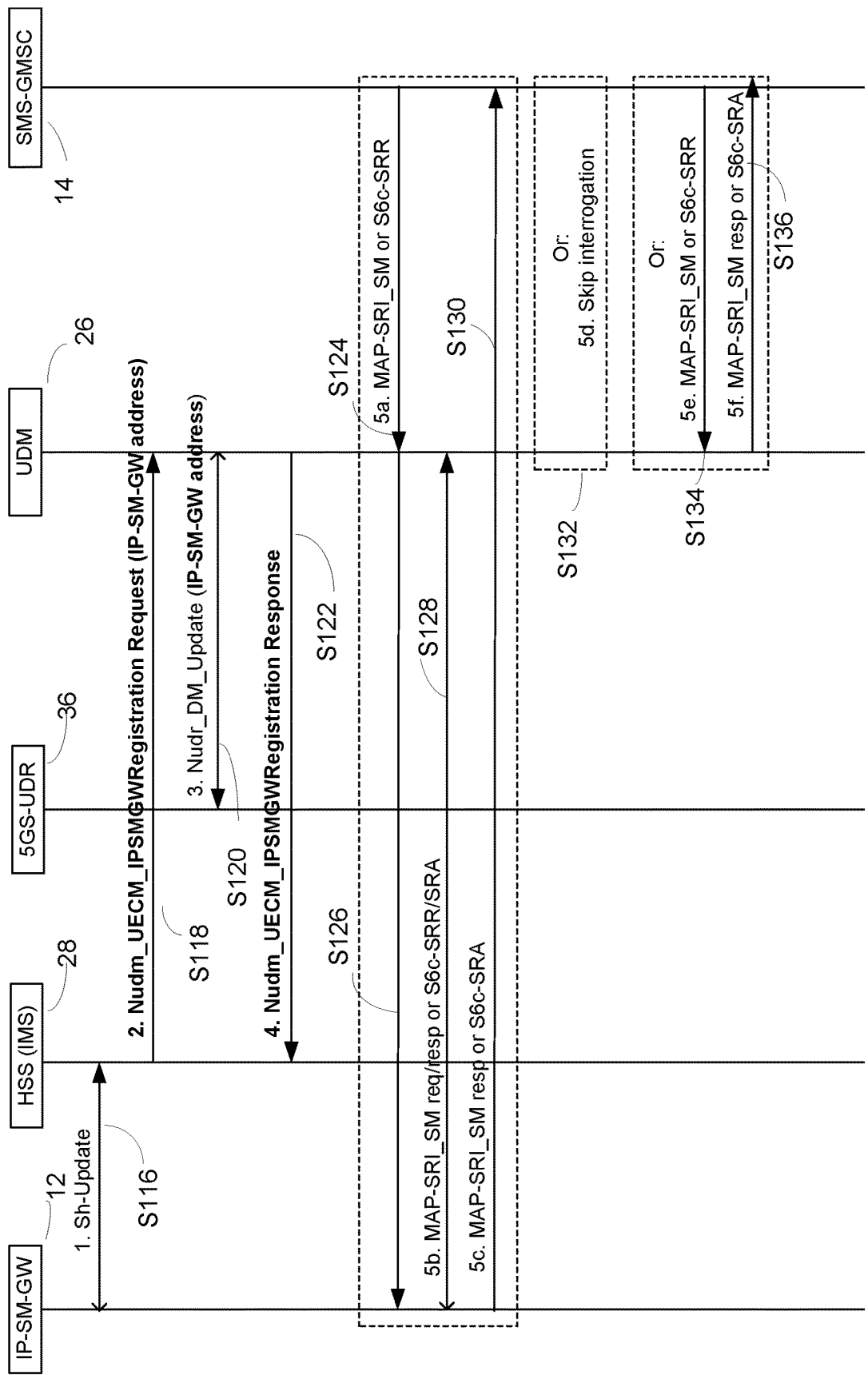
FIG. 9 illustrates an example call flow diagram for the registration of the IP-SM-GW address in the UDM and subsequent SMS routing information retrieval according to some embodiments of the present disclosure.

FIG. 9 shows an example call flow diagram for the registration of the IP-SM-GW address in the UDM node 26 and subsequent SMS routing information retrieval, as shown in the following call flow diagram steps:

S116. The IP-SM-GW 12 registers its address in an HSS node 28 (IMS) via the Sh interface as defined in e.g., 3GPP TS 23.204. If the Evolved Packet System UDR (EPS-UDR network node 36) is used, the HSS node 28 (IMS) stores the IP-SM-GW's 12 address in the EPS-UDR network node 36.

S118. The HSS node 28 forwards the IP-SM-GW's 12 registration to the UDM node 26 using e.g., a Nudm_UECM_IPSMGWRegistration request. The request includes the address of the IP-SM-GW 12 to be registered in the UDM node 26.

S120. If the 5GS-UDR is used, the UDM node 26 stores the IP-SM-GW's 12 address in the 5GS-UDR using the Nudr_DM_Update service operation.

S122. The UDM node 26 confirms the IP-SM-GW's 12 registration with a successful Nudm_UECM_IPSMGWRegistration response.

After successful registration of the IP-SM-GW's 12 address, the UDM node 26 determines whether message waiting data are stored and alerts all Service Centres using procedures described in, for example, 3GPP TS 23.204 if applicable.

S124-S136. The UDM node 26 receives a request for routing information from the SMS-GMSC 14 via MAP or Diameter. If the 5GS-UDR is used, the UDM node 26 queries the 5GS-UDR to read the registered Short Message Service Function (SMSF) and/or IP-SM-GW 12, if any. Routing information is provided to SMS-GMSC 14 from IP-SM-GW 12 or UDM node 26.

The options 5a-5f, i.e., steps S124-S136 shown in FIG. 9 are based on the options for MT SMS procedure described in section 6.4 of 3GPP TS 23.204, considering a 5GC only deployment where the UDM node 26 is present and HLR/HSS serving 2G/3G/4G accesses are not deployed. Steps 5a-5c correspond to 3a-3c; step 5d corresponds to 3d; and steps 5e-5f correspond to 3e-3f, respectively, as shown in figure 6.4 of 3GPP TS 23.204.

Figure 10:
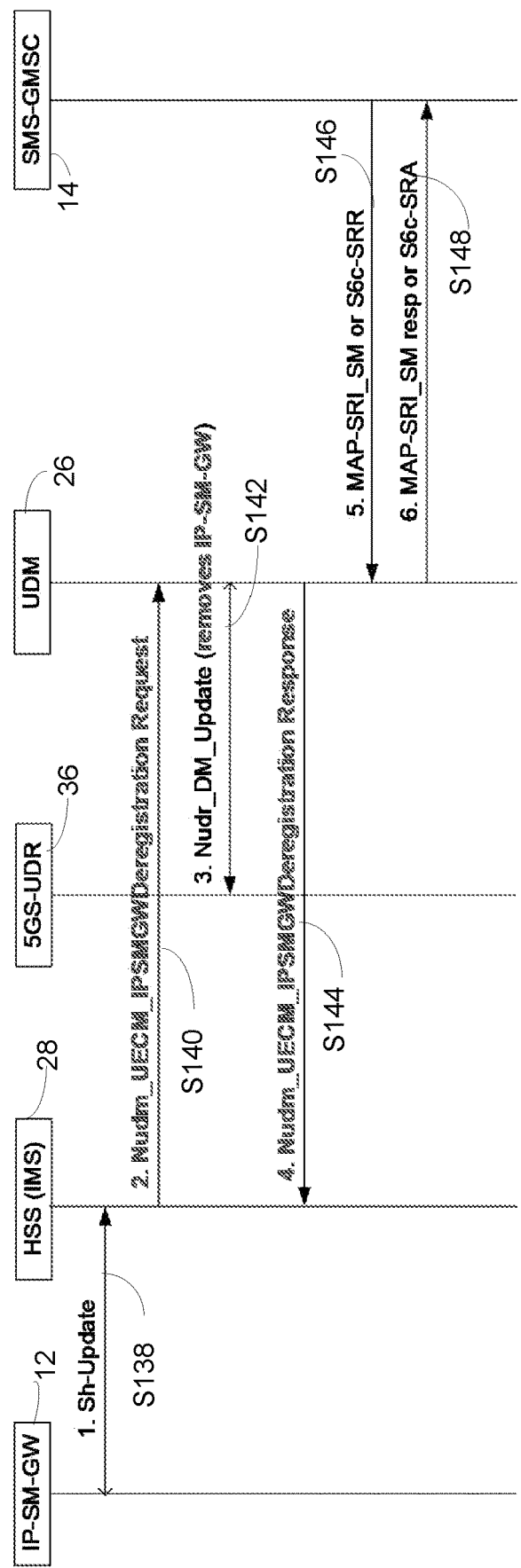
FIG. 10 illustrates an example call flow diagram for the deregistration of the IP-SM-GW address in the UDM according to some embodiments of the present disclosure.

FIG. 10 shows an example call flow diagram for the deregistration of the IP-SM-GW 12 address in the UDM node 26, as shown in the following call flow diagram steps:

S138. The IP-SM-GW 12 deregisters its address in the HSS node 28 (IMS) via Sh as defined in, for example, 3GPP TS 23.204. If the EPS-UDR network node 36 is used, the HSS node 28 (IMS) removes the IP-SM-GW's 12 address from the EPS-UDR network node 36.

S140. The HSS node 28 forwards the IP-SM-GW's 12 deregistration request to the UDM node 26 using a Nudm_UECM_IPSMGWDeregistration request.

S142. If the 5GS-UDR is used, the UDM node 26 removes the IP-SM-GW's 12 address from the 5GS-UDR using the Nudr_DM_Update service operation.

S144. The UDM node 26 confirms the IP-SM-GW's 12 deregistration with a successful Nudm_UECM_IPSMGW-Deregistration response.

S146-S148. If the UDM node 26 receives a request for routing information from the SMS-GMSC via MAP or Diameter, the UDM node 26 determines if there is an IP-SM-GW 12 address registered for the UE 22. If the 5GS-UDR is used, the UDM node 26 queries the 5GS-UDR to read the registered SMSF and/or IP-SM-GW 12, if any. If an IP-SM-GW 12 address is not present, the UDM node 26 may follow the MT SMS procedures defined in section 4.13.3 of 3GPP TS 23.502 and 3GPP TS 23.040.

Embodiment 2: IP-SM-GW Address Retrieval by UDM

In addition, or alternatively, in some embodiments, when the UDM node 26 receives a request for routing information from the SMS-GMSC 14 via MAP or Diameter, the UDM node 26 may determine in the HSS node 28 (IMS) if there is an IP-SM-GW 12 address.

Figure 11:
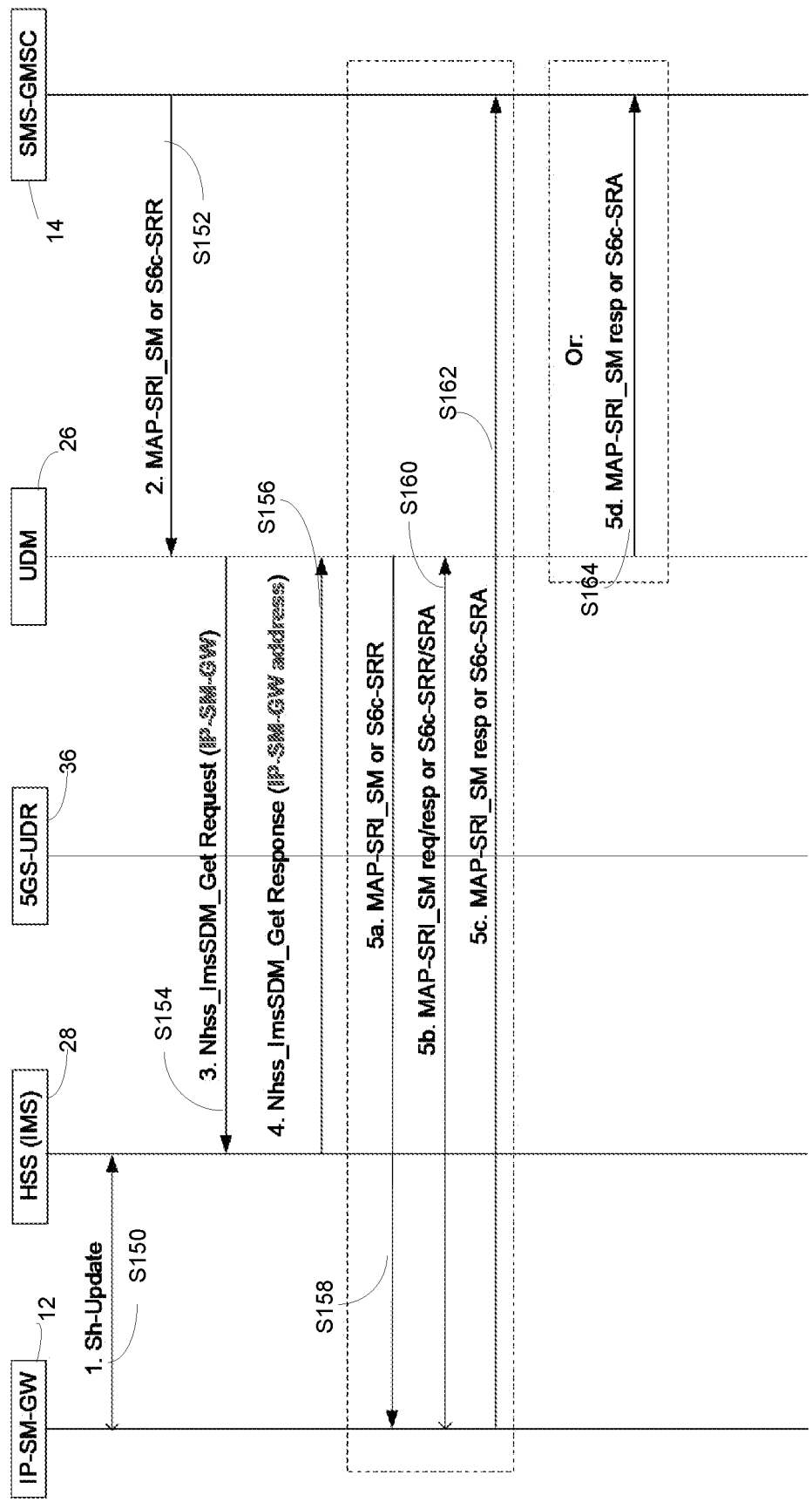
FIG. 11 illustrates an example call flow diagram for the retrieval of the IP-SM-GW address from the HSS (IMS) by the UDM upon reception of SMS routing information request according to some embodiments of the present disclosure.

FIG. 11 shows an example call flow diagram for the retrieval of the IP-SM-GW 12 address from the HSS node 28 (IMS) by the UDM node 26 upon reception of an SMS routing information request, as shown in the following call flow diagram steps:

S150. The IP-SM-GW 12 registers its address in HSS node 28 (IMS) via the Sh interface as defined in 3GPP TS 23.204. If the EPS-UDR network node 36 is used, the HSS node 28 (IMS) stores the IP-SM-GW 12 address in the EPS-UDR network node 36.

S152. At any time, the UDM node 26 may receive a request for routing information from the SMS-GMSC 14 via MAP or Diameter.

S154. The UDM node 26 determines whether the IP-SM-GW 12 address is available in the HSS node 28 (IMS) using the Nhss_ImsSDM_Get service operation (e.g., sending a Nhss_ImsSDM_Get Request( ) to HSS node 28).

S156. The HSS node 28 (IMS) provides in the Nhss_ImsSDM_Get response to the UDM node 26 the IP-SM-GW 12 address registered for the user.

S158-S164. SMS routing information including the IP-SM-GW's 12 address is provided to SMS-GMSC 14 as described in e.g., section 6.4 of 3GPP TS 23.204, considering a 5GC only deployment where UDM node 26 is present and HLR/HSS serving 2G/3G/4G accesses is not deployed.

Embodiment 3: IP-SM-GW Registration and Deregistration in 5GS-UDR

Additionally, and/or alternatively, the registration and deregistration of the IP-SM-GW 12 address in the UDM node 26 may be performed by direct interaction from the HSS node 28 (IMS) to 5GS-UDR (e.g., network node 36*b*).

Figure 12:
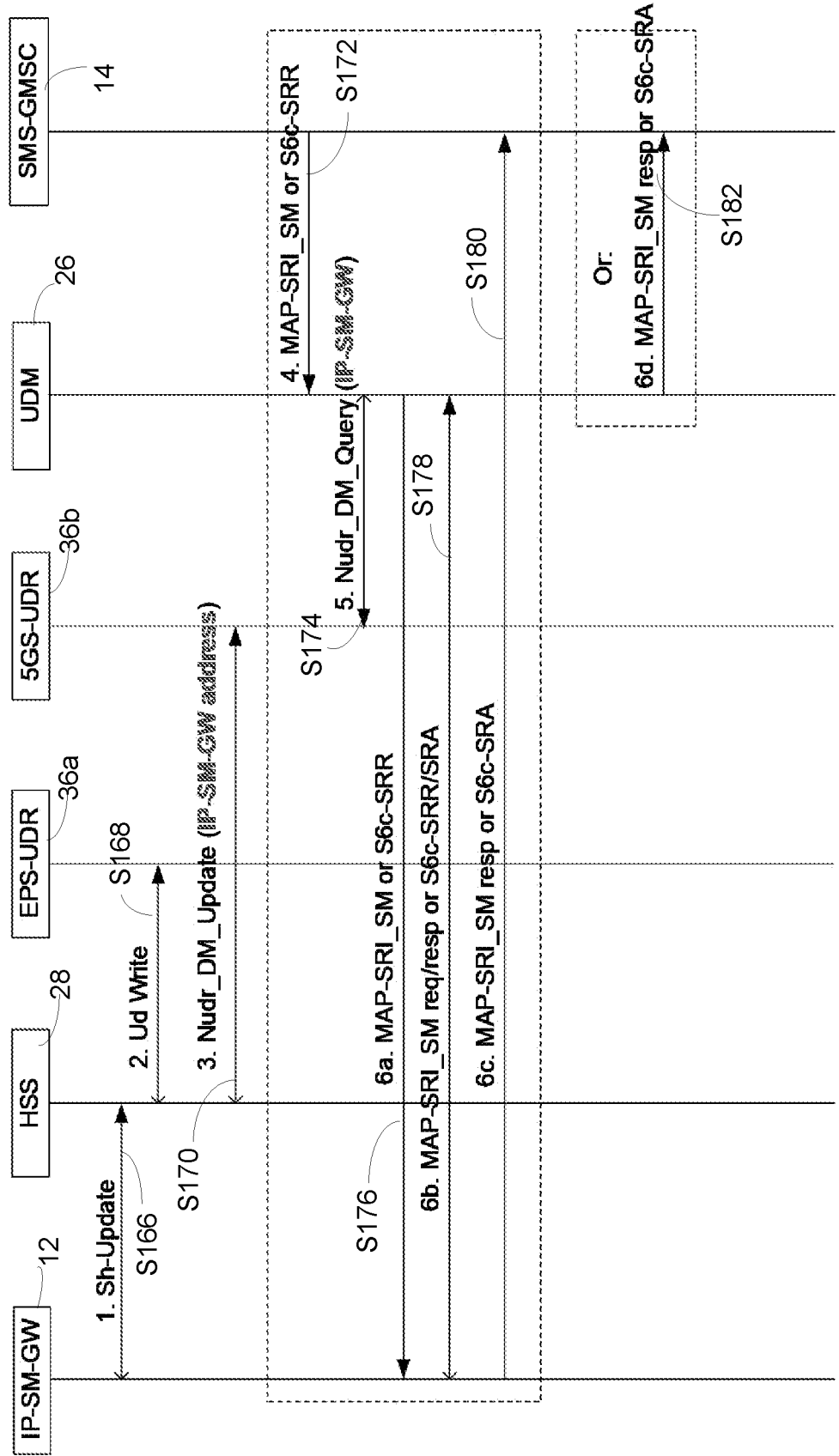
FIG. 12 illustrates an example call flow diagram for the registration (or deregistration) of the IP-SM-GW address in the 5GS-UDR and subsequent SMS routing information retrieval according to some embodiments of the present disclosure.

FIG. 12 shows an example call flow diagram for the registration (or deregistration) of the IP-SM-GW 12 address in the 5GS-UDR (e.g., network node 36*b*) and subsequent SMS routing information retrieval, as shown in the following call flow diagram steps:

S166. The IP-SM-GW 12 registers or deregisters its address in HSS node 28 (IMS) via Sh as defined in TS 23.204.

S168. If the EPS-UDR (e.g., network node 36*a*) is used, the HSS node 28 (IMS) stores (e.g., UD Write for registration) or removes (e.g., for deregistration) the IP-SM-GW 12 address in the EPS-UDR (e.g., network node 36*a*).

S170. The HSS node 28 (IMS) also stores (e.g., Nudr_DM_Update( ) for registration) or removes (e.g., for deregistration) the IP-SM-GW 12 address in the 5GS-UDR (e.g., network node 36*b*) using the Nudr_DM_Update service operation.

S172. The UDM node 26 receives a request for routing information from the SMS-GMSC 14 via MAP or Diameter.

S174. The UDM node 26 determines whether an IP-SM-GW 12 address is available in the 5GS-UDR (e.g., network node 36*b*) using the Nudr_DM_Query service operation.

S176-S182. SMS routing information including IP-SM-GW 12 address is provided to SMS-GMSC as described in section 6.4 of 3GPP TS 23.204, considering a 5GC only deployment where UDM node 26 is present and HLR/HSS serving 2G/3G/4G accesses is not deployed.

Some embodiments may include one or more of the following:

Embodiment A1. A method implemented in a data management (UDM) node, the method comprising:
  receiving, from a home subscriber server (HSS) node, an address of an Internet Protocol-Short Message-Gateway (IP-SM-GW), the IP-SM-GW serving a user for a Short Message Service (SMS).

Embodiment A2. The method of Embodiment A1, wherein receiving the address of the IP-SM-GW from the HSS node includes:
  receiving a registration request to register the IP-SM-GW in a unified data management (UDM) node, the registration request including the address of the IP-SM-GW associated with the user.

Embodiment A3. The method of Embodiment A2, further comprising at least one of:
  receiving a de-registration request to de-register the IP-SM-GW, the de-registration request including the address of the IP-SM-GW; and
  confirming one of the registration and the de-registration of the IP-SM-GW in a response message.

Embodiment A4. The method of any one of Embodiments A2 and A3, further comprising one or more of:
  storing the address in a unified data repository (UDR) node as part of the registration of the IP-SM-GW;
  removing the address in the UDR node as part of the deregistration of the IP-SM-GW;
  determining whether message waiting data are stored for the user associated with the IP-SM-GW; and/or
  using the address to communicate with the IP-SM-GW to provide a mobile terminated short message service (MT SMS) to a user equipment (UE) associated with the user.

Embodiment A5. The method of Embodiment A1, wherein receiving the address of the IP-SM-GW from the HSS node includes:
  determining whether the address is available in a home subscriber server (HSS) node by sending a request to the HSS node; and
  as a result of the request, receiving a response from the HSS node, the response including the address of the IP-SM-GW associated with the user.

Embodiment A6. The method of Embodiment A1, wherein receiving the address of the IP-SM-GW from the HSS node includes:
  querying a unified data repository (UDR) node for the address of the IP-SM-GW; and
  responsive to the query, receiving the address from the UDR node.

Embodiment B1. A method implemented in a home subscriber server (HSS) node, the method comprising:
  sending, to one of a unified data repository (UDR) node and a unified data management (UDM) node, an address of an Internet Protocol-Short Message-Gateway (IP-SM-GW), the IP-SM-GW serving a user for a Short Message Service (SMS).

Embodiment B2. The method of Embodiment B1, wherein sending, to the UDM node, the address of the IP-SM-GW includes:
  sending a registration request to register the IP-SM-GW, the registration request including the address of the IP-SM-GW associated with the user.

Embodiment B3. The method of Embodiment B2, further comprising at least one of:
  sending a de-registration request to de-register the IP-SM-GW, the de-registration request including the address of the IP-SM-GW; and
  receiving a confirmation of one of the registration and the de-registration of the IP-SM-GW in a response message.

Embodiment B4. The method of Embodiment B1, wherein sending, to the UDM node, the address of the IP-SM-GW is responsive to the HSS node:
  receiving a request for the address from the UDM node; and
  responsive to the request, sending a response to the UDM node, the response including the address of the IP-SM-GW associated with the user.

Embodiment B5. The method of Embodiment B1, wherein sending the address of the IP-SM-GW includes:
  sending the address of the IP-SM-GW to the UDR node.

Embodiment C1. A method implemented in a network node, the method comprising:
  receiving, from a home subscriber server (HSS) node, an address of an Internet Protocol-Short Message-Gateway (IP-SM-GW), the IP-SM-GW serving a user for a Short Message Service (SMS); and
  as a result of receiving a query from a unified data management (UDM) node for the address of the IP-SM-GW, sending the address of the IP-SM-GW to the UDM node.

Embodiment C2. The method of Embodiment C1, wherein the network node is a unified data repository (UDR) node.

Embodiment D1. A data management (UDM) node, the UDM node comprising processing circuitry, the processing circuitry configured to cause the UDM node to:
  receive, from a home subscriber server (HSS) node, an address of an Internet Protocol-Short Message-Gateway (IP-SM-GW), the IP-SM-GW serving a user for a Short Message Service (SMS).

Embodiment D2. The UDM node of Embodiment D1, wherein the processing circuitry is further configured to cause the UDM node to receive the address of the IP-SM-GW from the HSS node by being configured to cause the UDM node to:
  receive a registration request to register the IP-SM-GW in a unified data management (UDM) node, the registration request including the address of the IP-SM-GW associated with the user.

Embodiment D3. The UDM node of Embodiment D2, wherein the processing circuitry is further configured to cause the UDM node to at least one of:
  receive a de-registration request to de-register the IP-SM-GW, the de-registration request including the address of the IP-SM-GW; and
  confirm one of the registration and the de-registration of the IP-SM-GW in a response message.

Embodiment D4. The UDM node of any one of Embodiments D2 and D3, wherein the processing circuitry is further configured to cause the UDM node to one or more of:
  store the address in a unified data repository (UDR) node as part of the registration of the IP-SM-GW;
  remove the address in the UDR node as part of the registration of the IP-SM-GW;
  determine whether message waiting data are stored for the user associated with the IP-SM-GW; and/or
  use the address to communicate with the IP-SM-GW to provide a mobile terminated short message service (MT SMS) to a user equipment (UE) associated with the user.

Embodiment D5. The UDM node of Embodiment D1, wherein the processing circuitry is further configured to cause the UDM node to receive the address of the IP-SM-GW by being configured to cause the UDM node to:
- determine whether the address is available in a home subscriber server (HSS) node by sending a request to the HSS node; and
- as a result of the request, receive a response from the HSS node, the response including the address of the IP-SM-GW associated with the user.

Embodiment D6. The UDM node of Embodiment D1, wherein the processing circuitry is further configured to cause the UDM node to receive the address of the IP-SM-GW from the HSS node by being configured to cause the UDM node to:
- query a unified data repository (UDR) node for the address of the IP-SM-GW; and
- responsive to the query, receive the address from the UDR node.

Embodiment E1. A home subscriber server (HSS) node, the HSS node comprising processing circuitry, the processing circuitry configured to cause the HSS node to:
- send, to one of a unified data repository (UDR) node and a unified data management (UDM) node, an address of an Internet Protocol-Short Message-Gateway (IP-SM-GW), the IP-SM-GW serving a user for a Short Message Service (SMS).

Embodiment E2. The HSS node of Embodiment E1, wherein the processing circuitry is configured to send, to the UDM node, the address of the IP-SM-GW by being configured to cause the HSS node to:
- send a registration request to register the IP-SM-GW, the registration request including the address of the IP-SM-GW associated with the user.

Embodiment E3. The HSS node of Embodiment E2, wherein the processing circuitry is further configured to cause the HSS node to at least one of:
- send a de-registration request to de-register the IP-SM-GW, the de-registration request including the address of the IP-SM-GW; and
- receive a confirmation of one of the registration and the de-registration of the IP-SM-GW in a response message.

Embodiment E4. The HSS node of Embodiment E1, wherein the processing circuitry is configured to send, to the UDM node, the address of the IP-SM-GW by being configured to cause the HSS node to:
- receive a request for the address from the UDM node; and
- responsive to the request, send a response to the UDM node, the response including the address of the IP-SM-GW associated with the user.

Embodiment E5. The HSS node of Embodiment E1, wherein the processing circuitry is configured to send the address of the IP-SM-GW by being configured to cause the HSS node to:
- send the address of the IP-SM-GW to the UDR node.

Embodiment F1. A network node, the network node comprising processing circuitry, the processing circuitry configured to cause the network node to:
- receive, from a home subscriber server (HSS) node, an address of an Internet Protocol-Short Message-Gateway (IP-SM-GW), the IP-SM-GW serving a user for a Short Message Service (SMS); and
- as a result of receiving a query from a unified data management (UDM) node for the address of the IP-SM-GW, send the address of the IP-SM-GW to the UDM node.

Embodiment F2. The network node of Embodiment F1, wherein the network node is a unified data repository (UDR) node.

It should be understood that although the example embodiments discussed herein may use one or another type of message or one or another network node arrangement or context, the techniques disclosed herein may be used with other types of messages or other types of network architecture arrangements or other contexts, to support SMS delivery according to the techniques provided in this disclosure.

Some embodiments of the present disclosure provide for one or more new procedures to allow the IP-SM-GW address to become available to the UDM in deployment scenarios where, for example, 2G/3G/4G accesses are not supported and/or support of SMS over IP is to be provided.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a unified data management, UDM, node, the method comprising:
   receiving, by the UDM node, a registration request from a home subscriber server, HSS, node that registered an address of an Internet Protocol-Short Message-Gateway, IP-SM-GW, the registration request being to register the IP-SM-GW at the UDM node, and the registration request comprising the address of the IP-SM-GW;
   confirming the registration of the IP-SM-GW in a response message to the HSS node; and
   as a result of receiving the registration request comprising the address of the IP-SM-GW from the HSS node, determining message waiting data.

2. The method of claim 1, further comprising:
   storing the received address of the IP-SM-GW in a unified data repository, UDR, node as part of the registration of the IP-SM-GW.

3. The method of claim 1, further comprising:
   as a result of one or more of the registration of the IP-SM-GW and the received registration request comprising the address of the IP-SM-GW, one or more of:
   determining whether message waiting data are stored for a user associated with the IP-SM-GW;
   as a result of determining that the message waiting data are stored for the user, alerting at least one Short Message Service, SMS, service center, SC, and receiving a request for routing information from the at least one SMS SC; and
   using the address to communicate with the IP-SM-GW to provide a mobile terminated short message service, MT SMS, to a user equipment, UE, associated with the user.

4. The method of claim 1, further comprising one or more of:
   receiving, from the HSS node, a de-registration request to de-register the IP-SM-GW, the de-registration request comprising the address of the IP-SM-GW; and
   confirming a de-registration of the IP-SM-GW in a response message to the HSS node.

5. The method of claim 4, further comprising:
   removing the address of the IP-SM-GW from a unified data repository, UDR, node as part of the de-registration of the IP-SM-GW.

6. The method of claim 1, wherein one or more of:
   the HSS node comprises HSS functionality supporting Internet Protocol, IP, Multimedia Subsystem, IMS; and
   the HSS node lacks one or more of an HSS and Home Location Register, HLR, functionality supporting legacy access.

7. A method implemented in a home subscriber server, HSS, node, the method comprising:
   receiving a first registration request;
   registering an address of an Internet Protocol-Short Message-Gateway, IP-SM-GW, based on the first registration request;
   sending, to a unified data management, UDM, node, a second registration request, the second registration request being to register the IP-SM-GW at the UDM node, and the second registration request comprising the address of the IP-SM-GW; and
   receiving, from the UDM node, a confirmation of the registration of the IP-SM-GW in a response message.

8. The method of claim 7, further comprising:
   as a result of receiving a de-registration request, sending, to the UDM node, the de-registration request to de-register the IP-SM-GW, the de-registration request comprising the address of the IP-SM-GW; and
   receiving a confirmation of the de-registration of the IP-SM-GW in a response message.

9. The method of claim 7, wherein one or more of:
   the HSS node comprises HSS functionality supporting Internet Protocol, IP, Multimedia Subsystem, IMS; and
   the HSS node lacks one or more of an HSS and Home Location Register, HLR, functionality supporting legacy access.

10. A method implemented in a system, the system comprising a unified data management, UDM, node and a home subscriber server, HSS, node, the method comprising one or more of:
    the HSS node;
    registering an address of an Internet Protocol-Short Message Gateway, IP-SM-GW based on a first registration request; and
    sending, to the UDM node, a second registration request to register the IP-SM-GW at the UDM node, the registration request comprising the address of the IP-SM-GW; and the UDM node;
receiving, from the HSS node, the second registration request comprising the address of the IP-SM-GW; and
confirming the registration of the IP-SM-GW in a response message to the HSS node.

11. The method of claim 10, further comprising:
the UDM node storing the received address of the IP-SM-GW in a unified data repository, UDR, node as part of the registration of the IP-SM-GW.

12. The method of claim 10, further comprising:
as a result of one or more of the registration of the IP-SM-GW and the received registration request comprising the address of the IP-SM-GW, one or more of:
the UDM node determining whether message waiting data are stored for a user associated with the IP-SM-GW;
the UDM node, as a result of determining that the message waiting data are stored for the user, alerting at least one Short Message Service, SMS, service center, SC, and receiving a request for routing information from the at least one SMS SC; and
the UDM node using the address to communicate with the IP-SM-GW to provide a mobile terminated short message service, MT SMS, to a user equipment, UE, associated with the user.

13. The method of claim 10, further comprising:
the HSS node sending, to the UDM node, a de-registration request to de-register the IP-SM-GW, the de-registration request comprising the address of the IP-SM-GW;
the UDM node receiving, from the HSS node, the de-registration request comprising the address of the IP-SM-GW;
the UDM node confirming the de-registration of the IP-SM-GW in a response message to the HSS node; and
the UDM node removing the address of the IP-SM-GW from a UDR node as part of the de-registration of the IP-SM-GW.

14. The method of claim 10, wherein one or more of:
the HSS node comprises HSS functionality supporting Internet Protocol, IP, Multimedia Subsystem, IMS; and
the HSS node lacks one or more of an HSS and Home Location Register, HLR, functionality supporting legacy access.

15. A unified data management, UDM, node, the UDM node comprising processing circuitry, the processing circuitry configured to cause the UDM node to:
receive a registration request from a home subscriber server, HSS, node that registered an address of an Internet Protocol-Short Message-Gateway, IP-SM-GW, the registration request being to register the IP-SM-GW at the UDM node, and the registration request comprising the address of the IP-SM-GW;
confirm the registration of the IP-SM-GW in a response message to the HSS node; and
as a result of receiving the registration request comprising the address of the IP-SM-GW from the HSS node, determine message waiting data.

16. The UDM node of claim 15, wherein the UDM node is comprised in a system, the system further having a home subscriber server, HSS, node, the HSS node comprising processing circuitry, the processing circuitry configured to cause the HSS node to:
receive a first registration request;
register an address of an Internet Protocol-Short Message-Gateway, IP-SM-GW, based on the first registration request; and
send, to a unified data management, UDM, node, a second registration request, the second registration request being to register the IP-SM-GW at the UDM node, and the second registration request comprising the address of the IP-SM-GW.

17. A home subscriber server, HSS, node, the HSS node comprising processing circuitry, the processing circuitry configured to cause the HSS node to:
receive a first registration request;
register an address of an Internet Protocol-Short Message-Gateway, IP-SM-GW, based on the first registration request;
send, to a unified data management, UDM, node, a second registration request, the second registration request being to register the IP-SM-GW at the UDM node, and the second registration request comprising the address of the IP-SM-GW; and
receive, from the UDM node, a confirmation of the registration of the IP-SM-GW in a response message.

* * * * *